(12) United States Patent
Kleverman et al.

(10) Patent No.: US 7,859,617 B2
(45) Date of Patent: Dec. 28, 2010

(54) DISPLAY WITH VARIABLE REFLECTIVITY

(75) Inventors: Mats Kleverman, Helsingborg (SE); Gunnar Klinghult, Lund (SE); Rene Nilsson, Eslov (DE); Martin Ek, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1084 days.

(21) Appl. No.: 11/558,204

(22) Filed: Nov. 9, 2006

(65) Prior Publication Data

US 2008/0111958 A1    May 15, 2008

(51) Int. Cl.
*G02F 1/1335* (2006.01)
(52) U.S. Cl. ..................................... 349/114
(58) Field of Classification Search ............. None
See application file for complete search history.

(56) References Cited

U.S. PATENT DOCUMENTS

2002/0140884 A1* 10/2002 Richard ............... 349/113

2005/0094066 A1    5/2005 Brindel ................ 349/114

FOREIGN PATENT DOCUMENTS

| EP | 1 666 961 A1 | 6/2006 |
| WO | WO 00/63745 A | 10/2000 |
| WO | WO 02/14921 A1 | 2/2002 |
| WO | WO 2004/013687 A1 | 2/2004 |
| WO | WO 2005/029449 A1 | 3/2005 |

OTHER PUBLICATIONS

International Search Report and Written Opinion for corresponding PCT Application No. PCT/IB2007/051758, mailed Oct. 16, 2007, 13 pages.

* cited by examiner

*Primary Examiner*—Sung H Pak
(74) *Attorney, Agent, or Firm*—Harrity & Harrity, LLP

(57) ABSTRACT

A device may include a light source and a display. The display may include a switchable device configured to be in a transmissive state based on a first condition and be in a reflective state based on a second condition.

18 Claims, 8 Drawing Sheets

DISPLAY WITH VARIABLE REFLECTIVITY

TECHNICAL FIELD OF THE INVENTION

The invention relates generally to displays and, more particularly, to displays with variable reflectivity.

DESCRIPTION OF RELATED ART

Liquid crystal displays (LCDs) may be designed to be reflective, transmissive or transflective. In a transmissive LCD, light from a light source located on the backside of the LCD is used to illuminate the LCD. The transmissive LCD works well in low or normal ambient lighting conditions, but works poorly when the ambient lighting is high.

In a reflective LCD, ambient lighting may be used to illuminate the display. For example, a reflector located on the backside of the LCD reflects ambient light passing through the LCD to illuminate the LCD. A reflective LCD, however, does not work well in low ambient light conditions.

A transflective liquid crystal display (LCD) operates in two modes. A first mode is a transmissive mode which is ideal for low or normal ambient light conditions. In the transmissive mode, light from, for example, a white light source, located on the backside of the LCD is directed via a light guide through the various LCD layers. A second mode is a reflective mode which is ideal for high ambient light conditions. In the reflective mode, ambient light entering the front side of the LCD traverses one or more LCD layers and then is reflected back by a reflecting film positioned between the LCD and the light guide on the LCD's backside.

A major drawback with this arrangement is that the reflective film reduces the back light intensity. That is, the reflective film reduces the intensity of the light from the light source directed via the light guide that acts to backlight the LCD during low ambient light conditions. Therefore, high reflectivity associated with the reflective film implies low transmittance and vice versa.

In order to compensate for the transmittance loss due to the reflective film, increased backlight intensity may be applied. As a result, higher power consumption occurs as compared to when no reflective film is used. This higher power consumption causes power related problems in devices where battery power may be used to provide the lighting, such as shorter times between battery re-chargings.

SUMMARY

According to one aspect, a mobile communication device is provided. The mobile communication device comprises a transmitter configured to transmit signals, a receiver configured to receive signals and at least one light source. The mobile communication device also includes a light guide and a variable reflecting component disposed over at least a portion of the light guide. The variable reflecting component is configured to operate in a transmissive mode based on a first condition and operate in a reflective mode based on a second condition.

Additionally, the mobile communication device may comprise a sensor configured to detect ambient light. The mobile communication device may further comprise logic configured to identify the first condition based on the ambient light being less than a predetermined level, and identify the second condition based on the ambient light being greater than the predetermined level.

Additionally, the variable reflecting component may comprise at least one film and the mobile communication device may further comprise a power supply configured to supply power to the at least one film when the second condition exists.

Additionally, the power supply may be configured to terminate power to the at least one film or not supply power to the at least one film when the first condition exists.

Additionally, the mobile communication device may comprise a liquid crystal display disposed over the variable reflecting component and configured to be illuminated by light from the at least one light source directed via the light guide when the ambient light is less than the predetermined level, and be illuminated by ambient light when the ambient light is greater than the predetermined level.

Additionally, the variable reflecting component may comprise at least one film, the at least one film comprising a transition metal.

Additionally, the variable reflecting component may comprise a polymer network liquid crystal display.

Additionally, the mobile communication device may comprise a power supply configured to: supply power to the polymer network liquid crystal display based on at least one of an ambient light level being less than a predetermined level or a setting on the mobile communication device, and terminate power to the polymer network liquid crystal display based on at least one of the ambient light level being greater than the predetermined level or the setting on the mobile communication device.

Additionally, the first condition may correspond to ambient light conditions being less than a first level and the second condition may correspond to ambient light conditions being greater than the first level.

Additionally, the first and second conditions may be associated with ambient light levels and the variable reflecting device may be configured to automatically switch between the transmissive mode and the reflective mode based on the ambient light levels.

Additionally, the mobile communication device may further comprise logic configured to control the transmissive mode and reflective mode of the variable reflecting component based on ambient light conditions or input provided by a user of the mobile communication device.

Additionally, the mobile communication device may further comprise logic configured to provide power to the at least one light source when the first condition exits and not provide power or turn off the at least one light source when the second condition exists.

Additionally, the mobile communication device may further comprise logic configured to automatically switch the variable reflecting component between the transmissive mode and the reflective mode based on ambient light conditions.

According to another aspect, a method may be provided in a device comprising a display and a variable reflector. The method comprises sensing external light levels and automatically switching the variable reflector from a transmissive state to a reflective state based on a first sensed external light level.

Additionally, the method may comprise automatically switching the variable reflector from the reflective state to the transmissive state based on a second sensed external light level, wherein the second sensed external light level is less than the first sensed external light level.

Additionally, the automatically switching the variable reflector from a transmissive state to a reflective state may comprise: providing power to the variable reflector.

Additionally, the automatically switching the variable reflector from the reflective state to the transmissive state may comprise terminating power to the variable reflector.

Additionally, the method may comprise turning off a light source when the variable reflector is in the reflective state.

According to still another aspect, a device comprises transmitting means for transmitting radio frequency signals; receiving means for receiving radio frequency signals; display means and lighting means for illuminating the display means. The device also comprises reflector means located above the lighting means and means for varying a reflective quality of the reflector means based on ambient light levels associated with the device or input by a user of the device.

Additionally, the means for varying a reflective quality may comprise means for selectively providing power to the reflector means based on the ambient light levels.

According to yet another aspect, a device is provided. The device comprises at least one light source and a display. The display comprises a switchable device configured to be in a transmissive state based on a first condition and be in a reflective state based on a second condition.

Additionally, the device may further comprise a sensor configured to measure ambient light and logic configured to switch the switchable device to the transmissive state based on the ambient light being less than a predetermined level, and switch the switchable device to the reflective state based on the ambient light being greater than the predetermined level.

Additionally, the switchable device may comprise at least one film, the device further comprising a power supply configured to supply power to the at least one film when the switchable device is in the reflective state.

Additionally, the switchable device may comprise a polymer network liquid crystal display, the device further comprising a power supply configured to supply power to the polymer network liquid crystal display when the switchable device is in the reflective state.

Additionally, the display may be configured to be illuminated by light from the at least one light source directed when ambient light is less than a predetermined level, and be illuminated by ambient light when the ambient light is greater than the predetermined level.

Additionally, the first condition may correspond to ambient light conditions being less than a first level and the second condition may correspond to ambient light conditions being greater than the first level.

Additionally, the device may further comprise logic configured to turn off the at least one light when the second condition exists.

In another aspect, a device comprises at least one light source, at least one variable reflecting element disposed over the light source and an input mechanism. The device her comprises logic configured to provide power to the at least one variable reflecting element based on a mode associated with the device to selectively highlight or darken at least a portion of the input mechanism.

Additionally, the input mechanism may comprise at least one of a keyboard or keypad and the logic may be configured to cause the at least one variable reflecting element to be in a transmissive state or a reflective state based on the mode in which the device is operating.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
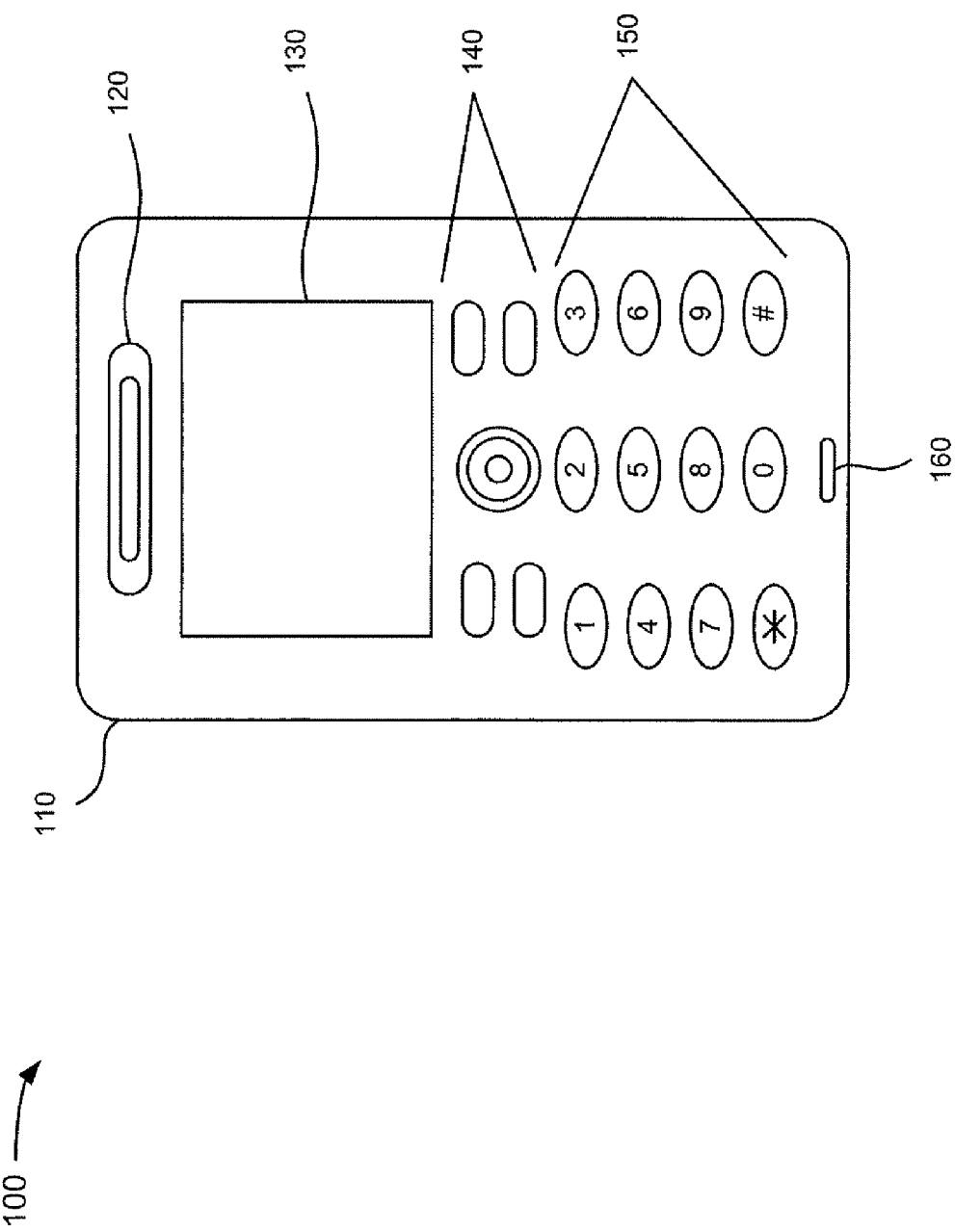
FIG. 1 is a diagram of an exemplary mobile terminal in which methods and systems described herein may be implemented.

FIG. 1 is a diagram of an exemplary mobile terminal 100 in which methods and systems described herein may be implemented. The invention is described herein in the context of a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Mobile terminal 100 may also include media playing capability. It should also be understood that systems and methods described herein may also be implemented in other devices that include displays, with or without including various other communication functionality. For example, mobile terminal 100 may include a personal computer (PC), a laptop computer, a PDA, a media playing device (e.g., an MPEG audio layer 3 (MP3) player, a video game playing device), etc.

Referring to FIG. 1, mobile terminal 100 may include a housing 110, a speaker 120, a display 130, control buttons 140, a keypad 150, and a microphone 160. Housing 110 may protect the components of mobile terminal 100 from outside elements. Speaker 120 may provide audible information to a user of mobile terminal 100.

Display 130 may provide visual information to the user. For example, display 130 may provide information regarding incoming or outgoing telephone calls and/or incoming or outgoing electronic mail (e-mail), instant messages, short message service (SMS) messages, etc. Display 130 may also display information regarding various applications, such as a phone book/contact list stored in mobile terminal 100, the current time, video games being played by a user, downloaded content (e.g., news or other information), etc.

In an exemplary implementation, display 130 may be a transflective LCD that includes a light guide and an adjustable or switchable reflector located on the backside of display 130. The adjustable reflector may allow display 130 to be efficiently backlit during low ambient lighting conditions, such as when mobile terminal 100 is being used indoors. The adjustable reflector may also allow ambient or external light with respect to mobile terminal 100 to be efficiently reflected back through the LCD during high ambient lighting conditions to illuminate the LCD. The reflective/transmissive quality of the adjustable reflector may be adjusted or switched based on the particular environment in which mobile terminal 100 is operating, as described in detail below. This may allow display 130 to be easily viewable in various light conditions without increasing power requirements associated with illuminating (e.g., backlighting) display 130.

Control buttons 140 may permit the user to interact with mobile terminal 100 to cause mobile terminal 100 to perform one or more operations, such as place a telephone call, play various media, etc. For example, control buttons 140 may include a dial button, hang up button, play button, etc. In an exemplary implementation, control buttons 140 may include one or more buttons that controls various illumination settings associated with display 130. For example, one of control buttons 140 may be used to toggle between a reflective mode associated with the adjustable reflector of display 130 and a transmissive mode for the adjustable reflector, as described in detail below. Further, one of control buttons 140 may be a menu button that permits the user to view various settings associated with mobile terminal 100. Using the menu, a user may also be able to toggle the adjustable reflector of display 130 between a reflective mode and a transmissive mode.

Keypad 150 may include a standard telephone keypad. Microphone 160 may receive audible information from the user.

Figure 2:
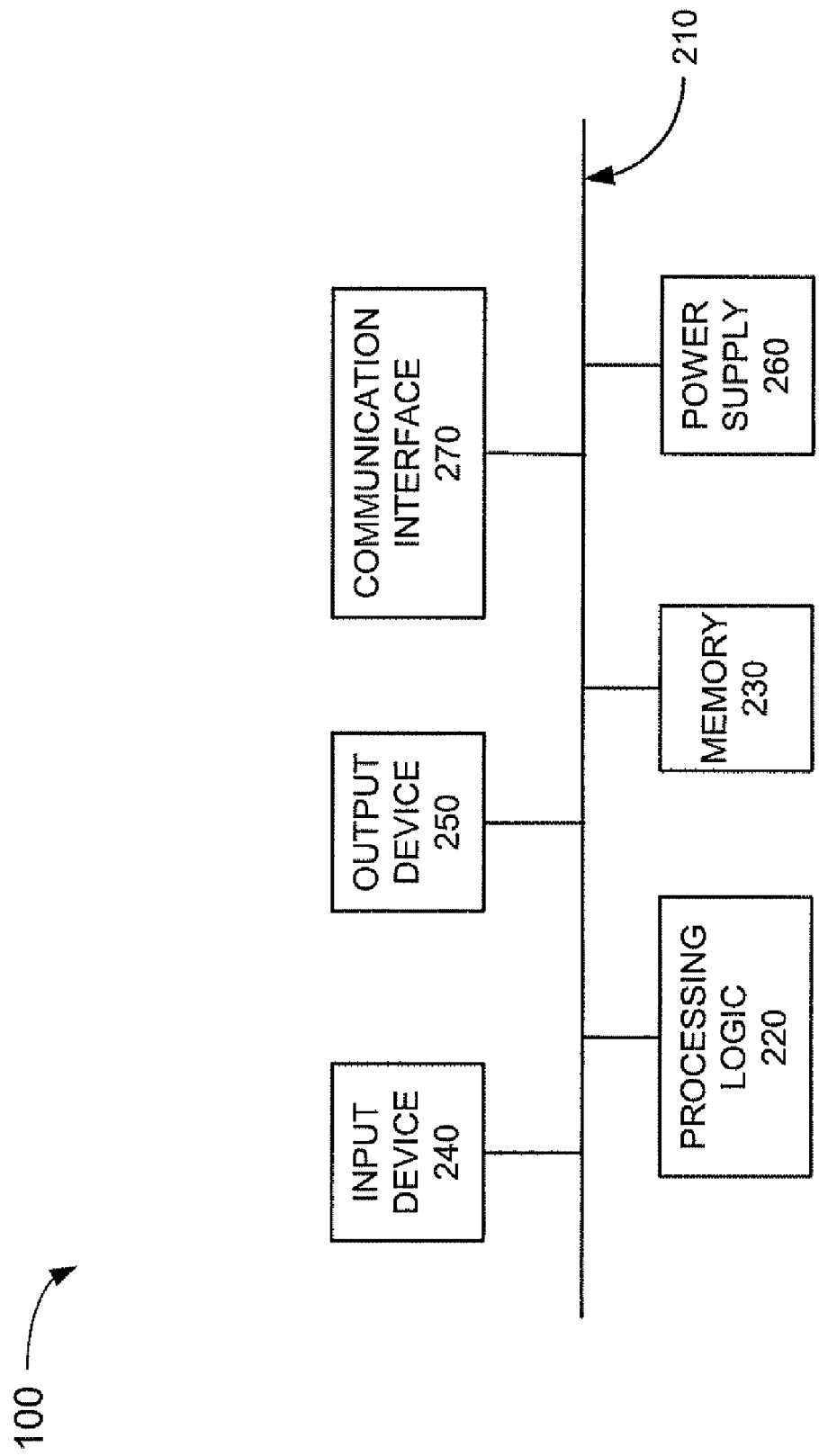
FIG. 2 is a diagram illustrating components of the mobile terminal of FIG. 1 according to an exemplary implementation.

FIG. 2 is a diagram illustrating components of mobile terminal 100 according to an exemplary implementation. Mobile terminal 100 may include bus 210, processing logic 220, memory 230, input device 240, output device 250, power supply 260 and communication interface 270. Bus 210 permits communication among the components of mobile terminal 100. One skilled in the art would recognize that mobile terminal 100 may be configured in a number of other ways and may include other or different elements. For example, mobile terminal 100 may include one or more modulators, demodulators, encoders, decoders, etc., for processing data.

Processing logic 220 may include a processor, microprocessor, an application specific integrated circuit (ASIC), field programmable gate array (FPGA) or the like. Processing logic 220 may execute software instructions/programs or data structures to control operation of mobile terminal 100.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more memory devices and/or carrier waves.

Input device 240 may include mechanisms that permit an operator to input information to mobile terminal 100, such as microphone 160, keypad 150, control buttons 140, a keyboard, a mouse, a pen, voice recognition and/or biometric mechanisms, etc. Input device 240 may also include one or more sensors that enable mobile terminal 100 to identify various external conditions. For example, input device 240 may include a light sensor that detects and/or measures ambient light conditions in the environment in which mobile terminal 100 is operating, as described in detail below.

Output device 250 may include one or more mechanisms that output information to the user, including a display, such as display 130, a printer, one or more speakers, such as speaker 120, etc. Power supply 260 may include one or more batteries or other power source components used to supply power to components of mobile terminal 100. Power supply 260 may also include control logic to control application of power from power supply 260 to one or more components of mobile terminal 100.

Communication interface 270 may include any transceiver-like mechanism that enables mobile terminal 100 to communicate with other devices and/or systems. For example, communication interface 270 may include a modem or an Ethernet interface to a LAN. Communication interface 270 may also include mechanisms for communicating via a network, such as a wireless network. For example, communication interface 270 may include one or more radio frequency (RF) transmitters, receivers and/or transceivers. Communication interface 270 may also include one or more antennas for transmitting and receiving RF data.

Mobile terminal 100 may provide a platform for a user to make and receive telephone calls, send and receive electronic mail, text messages, play various media, such as music files, video files, multi-media files, games, and execute various other applications. Mobile terminal 100 may also perform processing associated with switching or varying the reflectivity associated with components of display 130. Mobile terminal 100 may perform these operations in response to processing logic 220 executing sequences of instructions contained in a computer-readable medium, such as memory 230. Such instructions may be read into memory 230 from another computer-readable medium via, for example, communication interface 270. A computer-readable medium may include one or more memory devices and/or carrier waves. In alternative embodiments, hard-wired circuitry may be used in place of or in combination with software instructions to implement processes consistent with the invention. Thus, implementations described herein are not limited to any specific combination of hardware circuitry and software.

Figure 3:
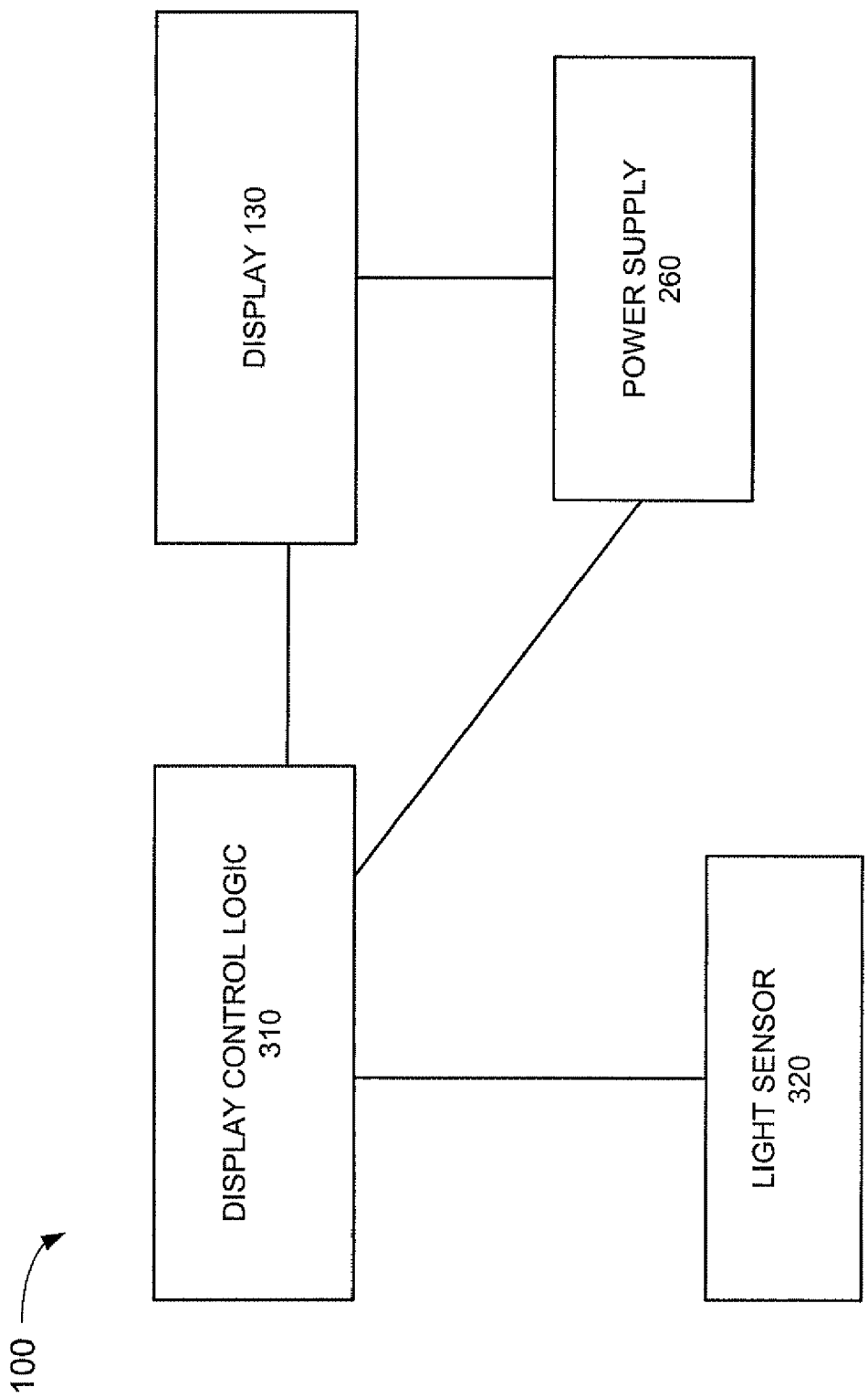
FIG. 3 illustrate exemplary components in the mobile terminal of FIG. 2 according to an exemplary implementation.

FIG. 3 is a functional diagram of components implemented in mobile terminal 100. Referring to FIG. 3, mobile terminal 100 may include display control logic 310, light sensor 320, display 130 and power supply 260. Display control logic 310 may be included in processing logic 220 and light sensor 320 may be included in input device 240.

Display control logic 310 may switch or change the degree of reflectivity of one or more components of display 130 based on, for example, the particular environment in which mobile terminal 100 is operating. In some implementations, light sensor 320 may sense the ambient lighting conditions and provide the sensed information to display control logic 310. Display control logic 310 may then automatically alter the reflectivity of one or more components of display 130 based on the light information corresponding to the particular circumstances.

For example, in one implementation, display control logic 310 may automatically signal or instruct power supply 260 to provide power to display 130 based on the sensed ambient or external lighting conditions to adjust the reflective/transmissive quality associated with display 130. In other implementations, a user may adjust a mode associated with the reflective/transmissive quality of display 130 using a control button or switch or set a mode associated with the reflective/transmissive quality of display 130 via a menu displayed to the user of mobile terminal 100. In each case, display control logic 310 may control display 130 and/or power supply 260 such that display 130 may switch from a more reflective mode to a more transmissive mode and vice versa, as described in detail below.

Light sensor 320 may be a sensor that receives ambient light and generates a signal representing the ambient light conditions. Light sensor 320 may continuously or periodically monitor the ambient light conditions and may automatically provide this signal/information to display control logic 310.

Display 130, as described above, may be a transflective LCD display. In an exemplary implementation, display 130 may include one or more films/layers and/or other components that enable display 130 to control its reflective/transmissive quality.

Figure 4:
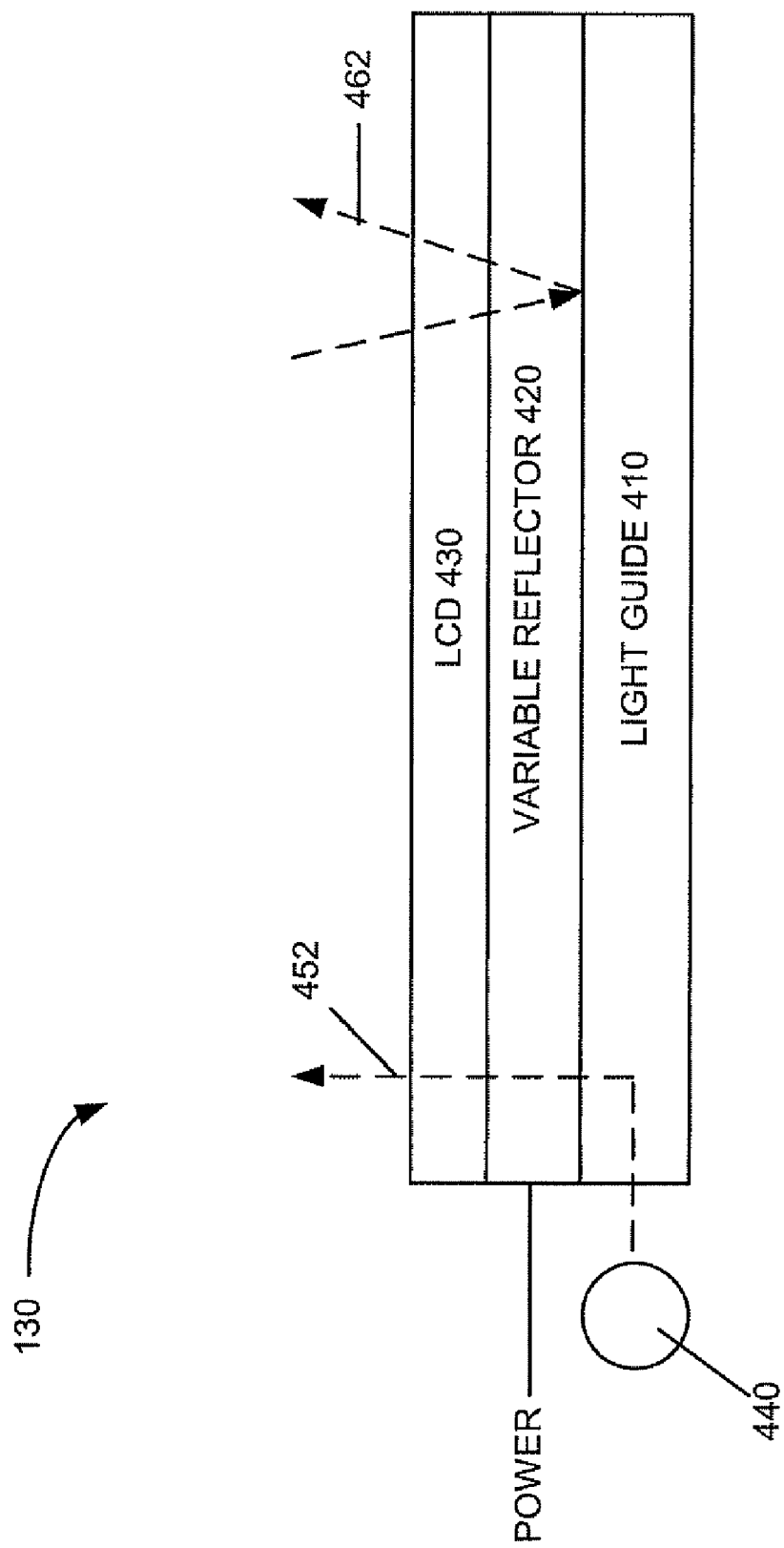
FIG. 4 is a diagram illustrating portions of the display of FIG. 1 according to an exemplary implementation.

FIG. 4 schematically illustrates portions of display 130 according to an exemplary implementation. Referring to FIG. 4, display 130 may include light guide 410, variable reflector 420, LCD 430, and light source 440. Light guide 410 may be a conventional light guide that directs light from a light source, such as light source 440, up through variable reflector 420 and LCD 430.

Variable reflector 420 may represent one or more films or layers for which the reflective/transmissive quality may be changed based on application of, for example, power, as described in detail below. This type of switching may be referred to as electrochromic switching.

LCD 430 may be any type of liquid crystal display or other display used to display information to a user. Light source 440 may be a conventional light source, such as a light emitting diode (LED), a fluorescent light source, incandescent light source, etc. Only one light source 440 is shown for simplicity. It should be understood that light source 440 may include a number of individual light sources, such as a number of LEDs. During low or normal level light conditions, light from light source 440 may be directed through light guide 410 and pass through variable reflector 420 and LCD 430, as illustrated by dashed lines 452 in FIG. 4. During high level light conditions, ambient light incident on an exposed surface of LCD 430 may pass through LCD 430 and substantially reflect off variable reflector 420 and substantially transmit back through LCD 430, as indicated by dashed lines 462 in FIG. 4, to at least partially illuminate LCD 430, as described in detail below.

Figure 5:
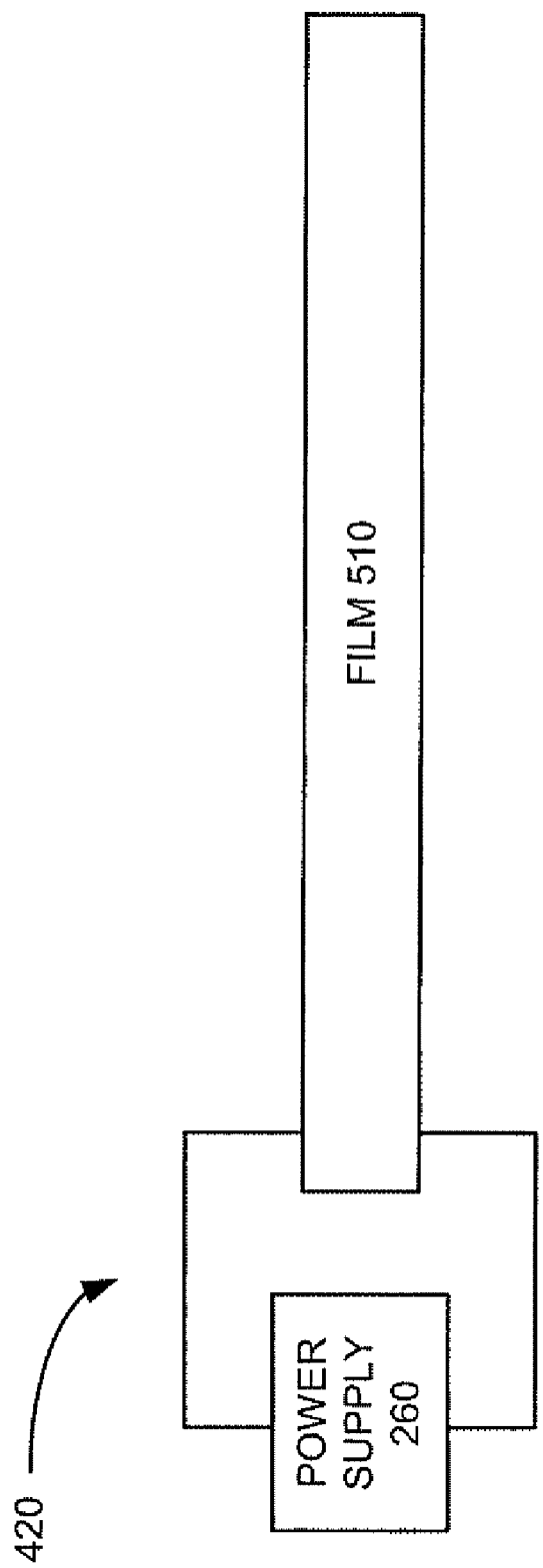
FIG. 5 is a diagram illustrating portions of the variable reflector of FIG. 4 according to an exemplary implementation.

FIG. 5 illustrates variable reflector 420 according to an exemplary implementation. In this implementation, variable reflector 420 may represent a transition metal switchable mirror (TMSM) based film/device. For example, TMSM films are able to alternate between transparent and reflective states based on, for example, application of power, exposure to a particular gas, such as hydrogen gas, or based on other factors. In this implementation, film 510 may switch between the reflective and transparent state based on power applied to variable reflector 420.

Referring to FIG. 5, variable reflector 420 may include film 510 connected to power supply 260. Power supply 260 may be used to apply an electric current to film 510. In an exemplary implementation, film 510 may include a transition metal, such as iron, nickel, copper, cobalt, or any other of the transition metals. In addition, film 510 may include a combination of various transition metals and/or one or more alloys including one or more transition metals. It has been found that application of power to a film, such as film 510, that includes one or more transition metals changes the transmissive/reflective quality of that film. For example, when power is applied to film 510, film 510 may switch from a predominately transmissive or transparent state to a predominately reflective state. That is, film 510 may normally be a transmissive or transparent film that allows light to pass with little reflection or refraction. When power is applied, film 510 may be activated to transition to a predominately reflective state. When power is removed, film 510 may revert or transition back to the transmissive state. Switching from a transmissive state to a reflective state may be used to control aspects of display 130 to enhance visibility of display 130 in a wide range of lighting conditions, as described in detail below.

Figure 6:
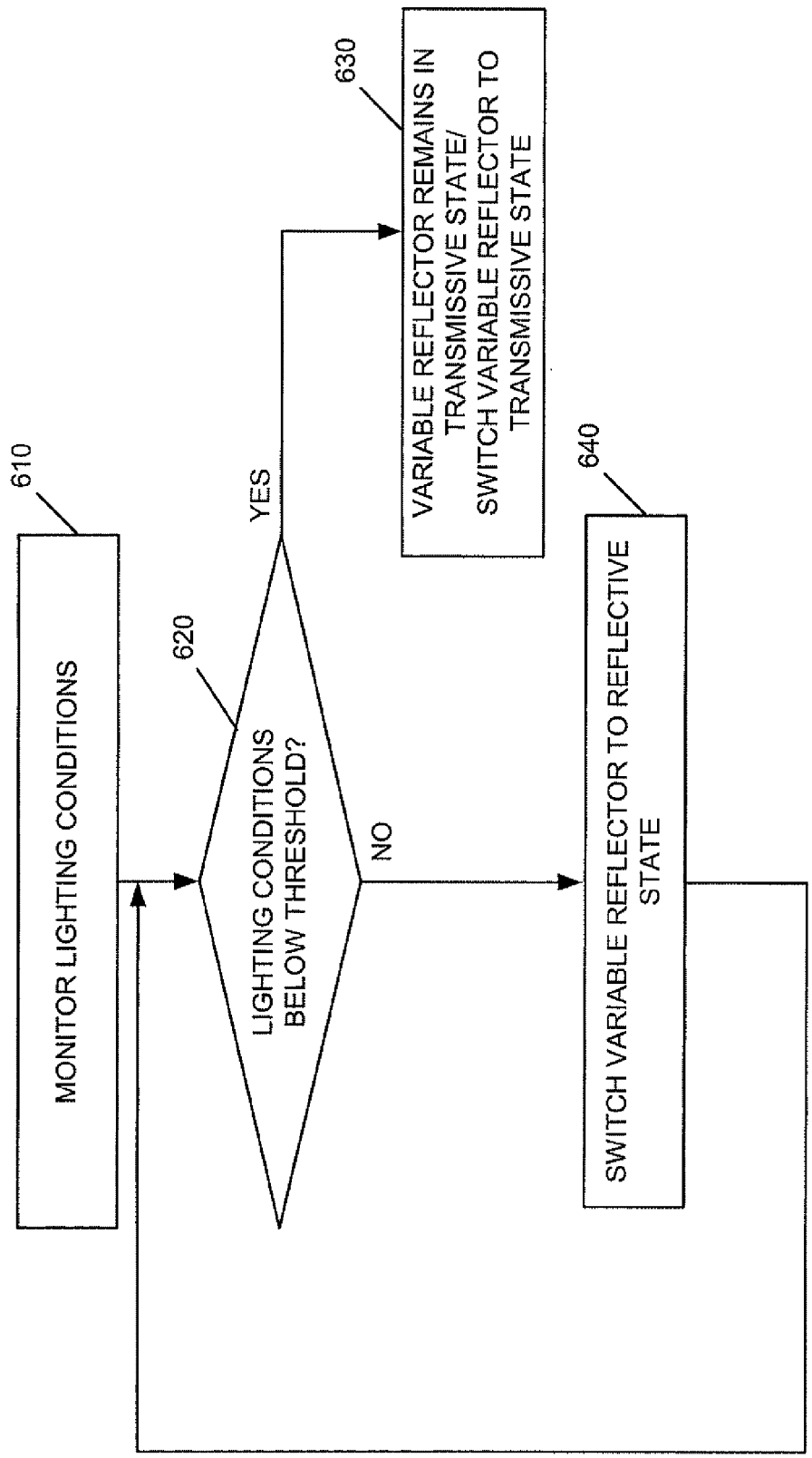
FIG. 6 is a flow diagram illustrating exemplary processing by a mobile terminal.

FIG. 6 is a flow diagram illustrating processing by mobile terminal 100 in an exemplary implementation. Processing may begin when mobile terminal 100 powers up. Light sensor 320 may automatically monitor the ambient lighting conditions in the environment in which mobile terminal 100 is operating (act 610). Light sensor 320 may also forward information representing the ambient lighting conditions to display control logic 310.

Display control logic 310 may then determine if the ambient lighting conditions are less than a predetermined lighting threshold (act 620). For example, the threshold may represent a level in which normal backlighting of display 130 is adequate for a user to easily view display 130 with little to no adverse effects on viewing from the ambient light. In this example, assume that mobile terminal 100 is being used indoors in an environment having normal indoor lighting and the information provided from light sensor 320 to display control logic 310 indicates that the lighting level is below the predetermined threshold. In this case, display control logic 310 may take no actions with respect to adjusting the transmissive/reflective quality of variable reflector 420.

For example, assume that upon powering up, variable reflector 420 is in the transmissive mode (e.g., power is not being supplied to film 510). In this case, display control logic 310 may not signal power supply 260 to provide power to variable reflector 420, causing variable reflector 420 to remain in the transmissive state (act 630).

Assume, however, that display control logic 310 determines that the ambient lighting conditions are not below the predetermined threshold. For example, assume that mobile terminal 100 is being used outside on a relatively sunny day. In this case, the ambient lighting information from light sensor 320 may indicate that ambient light is above the predetermined threshold. Display control logic 310 may then cause variable reflector 420 to change to a reflective state (act 640). For example, display control logic 310 may signal power supply 260 or control a switch associated with power supply 260 to provide power to film 510. As discussed above, upon application of power to film 510, film 510 may change from a transmissive or transparent state to a reflective state. In the reflective state, the ambient light transmitted through LCD 430 (FIG. 4) may be efficiently reflected by film 510 back through LCD 430 to illuminate LCD 430.

In some implementations, display control logic 310 may also automatically cut power from light source 440 or turn off light source 440 during this condition since the ambient light will be used to illuminate LCD 430. That is, when film 510 is in a reflective state, display control logic 310 may turn off light source 440 since the ambient light will be used to illuminate LCD 430. In this manner, power may be saved during high ambient lighting conditions in which backlighting provided via light source 440 is not required.

Mobile terminal 100 may then continue to operate with variable reflector 420 being in a reflective state until a change in ambient lighting conditions occurs. For example, assume that that a user of mobile terminal 100 moves indoors. Light sensor 320 detects the ambient lighting conditions and forwards this information to display control logic 310. Display control logic 310 then determines if the lighting conditions are below the predetermined threshold (act 620). In this case, assume that the lighting conditions are below the predetermined threshold.

Display control logic 310 may then switch variable reflector 420 from the reflective state back to a transmissive state (act 630). For example, display control logic 310 may signal or instruct power supply 260 or control a switch associated with power supply 260 to stop providing power to film 510. As discussed above, upon removal of power to film 510, film 510 will revert or transition back to a transmissive state. Light source 440 may then be able to efficiently backlight LCD 430 since the variable reflector 420 (e.g., film 510) is in a transmissive state.

Mobile terminal 100 may continue to operate in this manner. That is, variable reflector 420 may change its transmissive/reflective quality or state based on the ambient lighting conditions.

Figure 7:
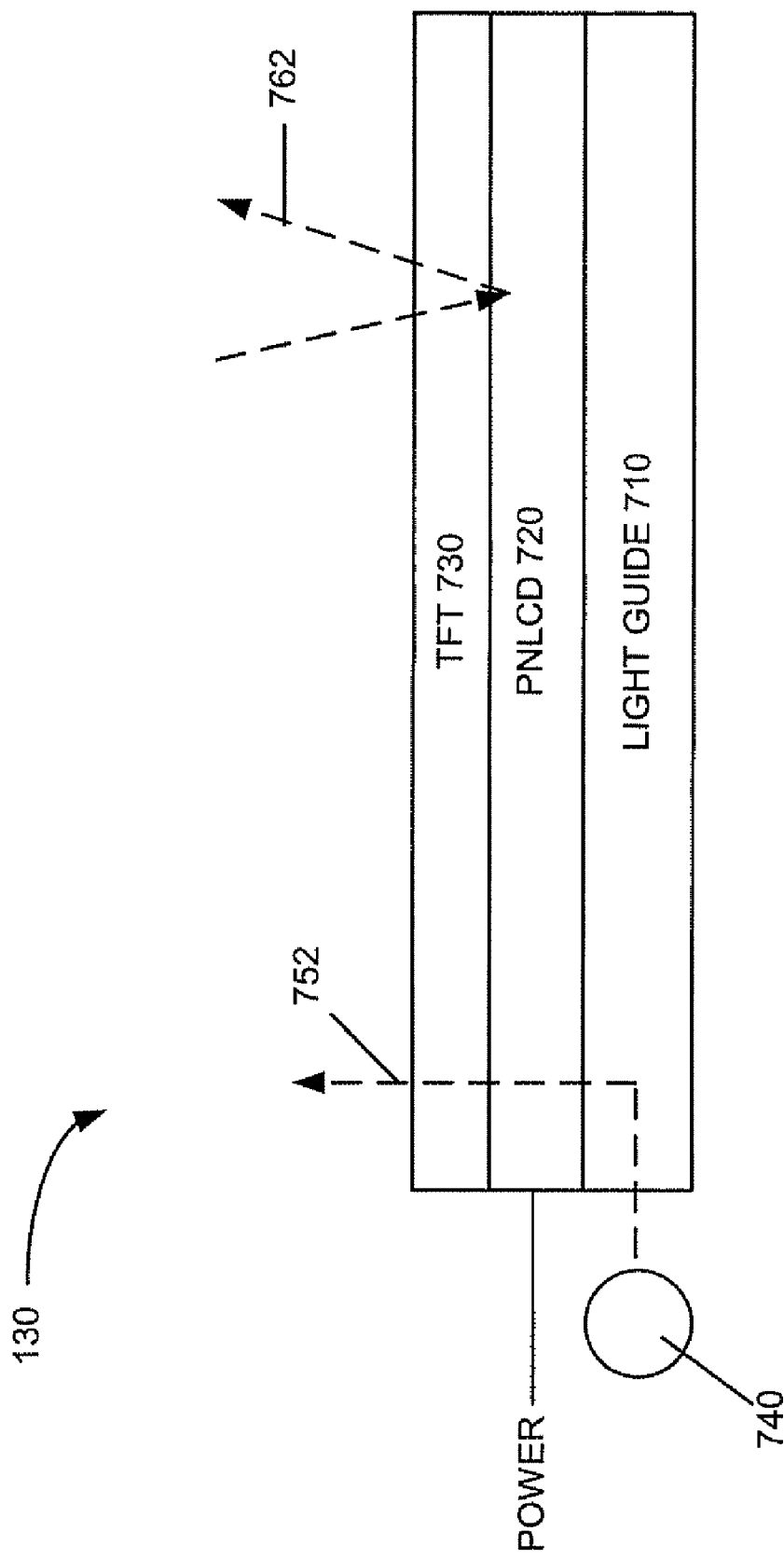
FIG. 7 is a diagram illustrating portions of the display of FIG. 1 according to another exemplary implementation.

In another embodiment, display 130 may include other types of materials that can be switched from a reflective state to a transmissive state and vice versa. For example, FIG. 7 schematically illustrates portions of display 130 according to another exemplary implementation. Referring to FIG. 7, display 130 may include light guide 710, polymer network liquid crystal display (PNLCD) 720, thin film transistor (TFT) 730 and light source 740. Light guide 710 may be a conventional light guide similar to light guide 410 that directs light from a light source, such as light source 740, up through PNLCD 720 and TFT 730.

PNLCD 720 may represent any PNLCD. For example, PNLCD 720 may include liquid crystals combined with one or more polymers that form one or more liquid crystal/polymer composite layers. The liquid crystal/polymer layer(s) may be formed between one or more substrate layers, such as one or more glass substrate layers (not shown) that form PNLCD 720. The reflective/transmissive quality of PNLCD 720 may be changed based on application of power. For example, in an exemplary implementation, PNLCD 720 may be highly transmissive/transparent when voltage is not supplied to PNLCD 720. However, when power is supplied to PNLCD 720, PNLCD 720 may become reflective, as described in more detail below.

TFT 730 may represent an array of thin film transistors associated with pixels of display 130. For example, each pixel forming display 130 may have one or more TFTs associated with that pixel that may be activated based on what is being displayed on display 130. Each pixel may be associated with a particular color or may be a monochrome pixel. Light source 740 may be a conventional light source (similar to light source 440 described above), such as an LED, a fluorescent light source, incandescent light source, etc. Only one light source 740 is shown for simplicity. It should be understood that light source 740 may include a number of individual light sources, such as a number of LEDs. During low or normal level light conditions, light from light source 740 may be directed through light guide 710 and pass through PNLCD 720 and TFT 730, as illustrated by dashed lines 752 in FIG. 7. During high level light conditions, ambient light incident on an exposed surface of display 130 may pass through TFT 730 and substantially reflect off PNLCD 720 and substantially transmit back through PNLCD 720, as indicated by dashed lines 762 in FIG. 7, to at least partially illuminate display 130, as described in detail below.

Figure 8:
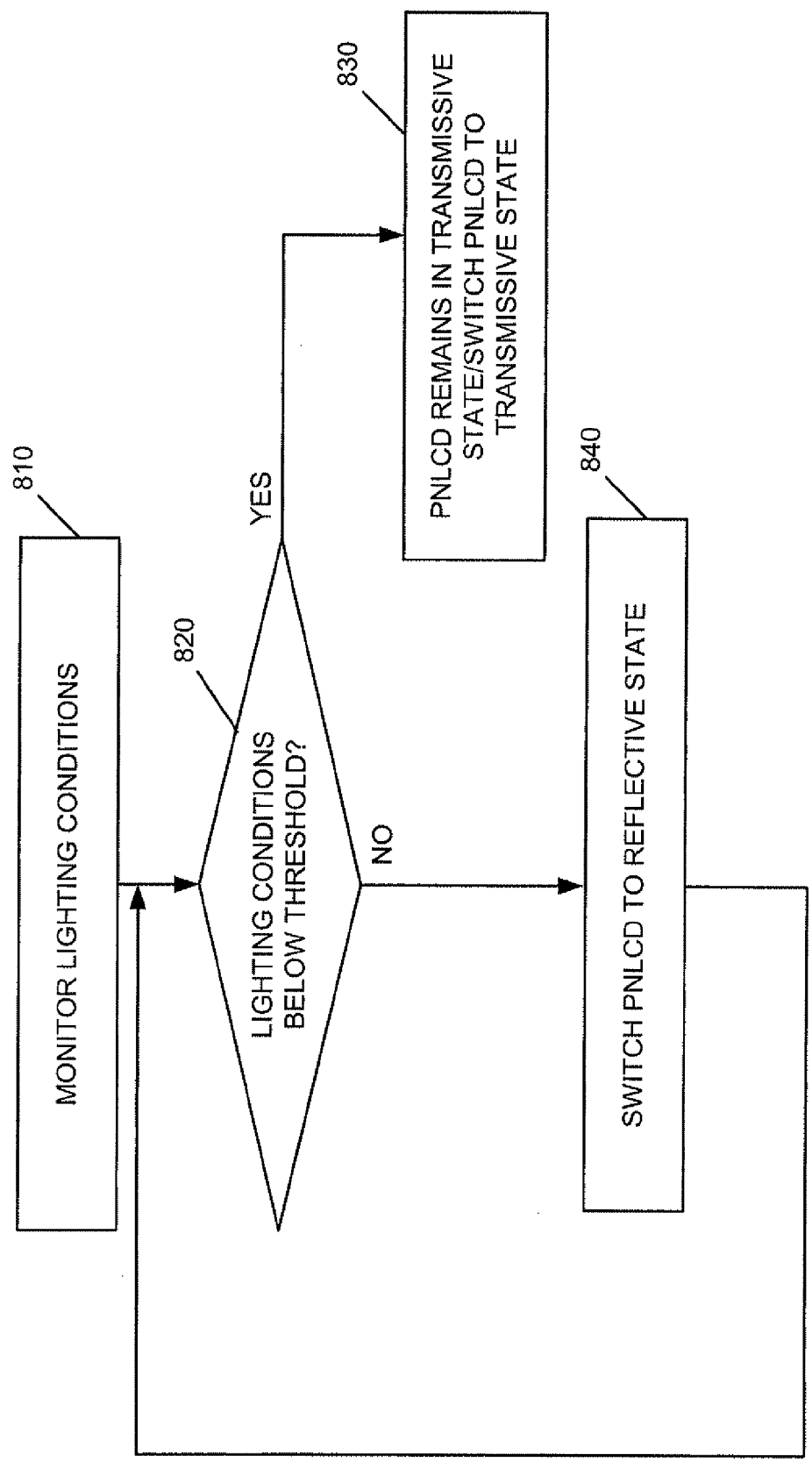
FIG. 8 is a flow diagram illustrating exemplary processing by a mobile terminal consistent with the implementation of FIG. 7.

FIG. 8 is a flow diagram illustrating processing by mobile terminal 100 in an exemplary implementation. Processing may begin when mobile terminal 100 powers up. Light sensor 320 may automatically monitor the ambient lighting conditions in the environment in which mobile terminal 100 is operating (act 810). Light sensor 320 may also forward information representing the ambient lighting conditions to display control logic 310.

Display control logic 310 may then determine if the ambient lighting conditions are less than a predetermined lighting threshold (act 820). For example, the threshold may represent a level in which normal backlighting of display 130 is adequate for a user to easily view display 130 with little to no adverse effects on viewing from the ambient light. In this example, assume that mobile terminal 100 is being used indoors in an environment having normal indoor lighting and the information provided from light sensor 320 to display control logic 310 indicates that the lighting level is below the predetermined threshold. In this case, display control logic 310 may take no actions with respect to adjusting the transmissive/reflective quality of PNLCD 720.

For example, assume that upon powering up, PNLCD 720 is in the transmissive mode (e.g., power is not being supplied to PNLCD 720). In this case, display control logic 310 may not signal power supply 260 to provide power to PNLCD 720, causing PNLCD 720 to remain in the transmissive state (act 830).

Assume, however, that display control logic 310 determines that the ambient lighting conditions are not below the predetermined threshold. For example, assume that mobile terminal 100 is being used outside on a relatively sunny day. In this case, the ambient lighting information from light sensor 320 may indicate that ambient light is above the predetermined threshold. Display control logic 310 may then cause PNLCD 720 to change to a reflective state (act 840). For example, display control logic 310 may signal power supply 260 or control a switch associated with power supply 260 to provide power to PNLCD 720. As discussed above, upon application of power to PNLCD 720, PNLCD 720 may change from a transmissive or transparent state to a reflective state. In the reflective state, the ambient light transmitted through TFT 730 (FIG. 7) may be efficiently reflected by PNLCD 720 back through TFT 730 to illuminate display 130.

In some implementations, display control logic 310 may also automatically cut power from light source 740 or turn off light source 740 during this condition since the ambient light will be used to illuminate display 130. That is, when PNLCD 720 is in a reflective state, display control logic 310 may turn off light source 740 since the ambient light will be used to illuminate display 130. In this manner, power may be saved during high ambient lighting conditions in which backlighting provided via light source 740 is not required.

Mobile terminal 100 may then continue to operate with PNLCD 720 being in a reflective state until a change in ambient lighting conditions occurs. For example, assume that that a user of mobile terminal 100 moves indoors. Light sensor 320 detects the ambient lighting conditions and forwards this information to display control logic 310. Display control logic 310 then determines if the lighting conditions are below the predetermined threshold (act 820). In this case, assume that the lighting conditions are below the predetermined threshold.

Display control logic 310 may then switch PNLCD 720 from the reflective state back to a transmissive state (act 830). For example, display control logic 310 may signal or instruct power supply 260 or control a switch associated with power supply 260 to stop providing power to PNLCD 720. As discussed above, upon removal of power to PNLCD 720, PNLCD 720 will revert or transition back to a transmissive state. Light source 740 may then be able to efficiently backlight display 130 since PNLCD 720 is in a transmissive state.

Mobile terminal 100 may continue to operate in this manner. That is, mobile terminal 100 may switch the transmissive/reflective quality or state of PNLCD based on the ambient lighting conditions.

In the implementations described above, mobile terminal 100 has been described as automatically switching the transmissive/reflective quality of variable reflector 420/PNLCD 720 based on ambient light levels. In alternative implementations, a user of mobile terminal 100 may change the characteristics of variable reflector 420 or PNLCD 720 using one of control buttons 140 and/or a function associated with a menu of options provided to the user. For example, when a user is unable to clearly see display 130, such as in bright ambient lighting conditions, the user may select an outdoors/reflective mode associated with display 130. In this case, mobile terminal 100 may provide power to film 510 or PNLCD 720 to put film 510/PNLCD 720 into a reflective state. When the user later moves indoors, the user may toggle the outdoors/reflective mode setting to an indoors/transmissive setting to power down film 510/PNLCD 720, thereby returning film 510/PNLCD 720 to a transmissive state to allow for efficient backlighting of display 130 by light source 440/740.

In the above implementations, a single variable reflector device (i.e., variable reflector 420 or PNLCD 720) has been described as being used to provide variable reflective/transmissive qualities. In other implementations, multiple variable reflectors may be used. In still other implementations, variable reflector 420 or PNLCD 720 may cover only a portion of light guide 410/710 and/or a portion of the backside of LCD 430/TFT 730, as opposed to the entire surface of light guide 410 and/or backside of LCD 430/TFT 730, based on the particular requirements.

In another alternative implementation, a variable reflector device, such as variable reflector 420 or PNLCD 720, may be used to highlight particular items of interest. For example, in some implementations, a keyboard/keypad of a device, such as mobile terminal 100, may be used in two modes, such as a typing mode and a camera mode. In this situation, variable reflector 420 or PNLCD 720 may be used to selectively blacken out certain areas of the keyboard/keypad based on the particular operating mode.

For example, suppose that mobile terminal 100 is operating in a camera mode and certain keys on keypad 150 are not to be used (i.e., have no function in the camera mode). In this scenario, a number of films 510 may be located below keypad 150 in selected areas. When the particular keys in keypad 150 are to be darkened or blacked out, display control logic 310 may signal or instruct power supply 260 to provide power or not provide power to the film(s) 510 located in the areas where the portion of keypad 150 is to be darkened or blacked out. For example, assume that the ambient light level is below the predetermined threshold (e.g., mobile terminal 100 is being used indoors). In this case, display control logic 310 may signal or instruct power supply 260 to provide power to the number of films 510 located in the selected areas to cause those films 510 to be in a reflective state. In this case, light from light source 440 will be reflected back in those selected areas, thereby causing the keys of keypad 150 located above those films 510 to be dark or blacked out. Light from light source 440, however, will pass through other areas in which films 510 are not in a reflective state, thereby illuminated those keys which are to be used in the camera mode. This is the opposite case as that described above for lighting LCD 430. That is, power is selectively provided to film 510 to darken or black out certain areas of display. Similarly, when the ambient light level is above the predetermined threshold (e.g., mobile terminal 100 is being used outdoors on a sunny day), display control logic 310 may selectively provide power to portions of film 510 such that the selected portions of keypad 150 will not be visible (e.g., will be darkened or blacked out), while other keys will be illuminated, based on the particular mode in which mobile terminal 100 is operating.

PNLCD 720 may be used in a similar manner as film 510 to selectively darken or black out certain areas of display 130. That is, portions of PNLCD 720 may be selectively provided with power to darken or inhibit viewing of certain keys based on the particular mode in Which mobile terminal 100 is operating.

In this manner, one or more variable reflectors 420 or PNLCDs 720 may be used to highlight and/or darken certain portions of a keypad, keyboard or other input device. While only two modes of operation have been described above in this implementations (i.e., a typing mode and a camera mode), it should be understood that additional modes associated with the operation of mobile terminal 100 may exist (e.g., media playing mode, telephone mode, etc.). In each mode, one or more variable reflectors may be used to highlight and/or darken certain portions of an input device.

In still other implementations, one or more variable reflectors 420 or PNLCDs 720 may be used to allow certain portions of display 130 to be visible during, for example, a standby mode in which mobile terminal 100 is not actively performing various functions, such as placing or receiving a call, executing an application, etc. For example, during a standby mode in high ambient light conditions, ambient light may be used to provide lighting for a portion of display 130 that will be used to convey only certain information to a user, such as the current time, battery life, etc. In this case, portions of variable reflector 420/PNLCD 720 may be powered to be reflective in only certain areas of display 130 to allow ambient lighting to be reflected for highlighting a portion of display 130 that will be used to display the desired information, such as the current time, battery life, etc. In this manner, portions of a variable reflecting device, such as film 510 and/or PNLCD 720 may be selectively powered to allow desired information to be displayed.

CONCLUSION

Implementations described herein provide a display in which the transmissive/reflective quality or state of one or more components associated with the display can be adjusted or switched based on the particular environment. Advantageously, this may increase a user's ability to easily view the display in any ambient lighting conditions. In addition, switching the transmissive/reflective state may save power associated with powering the display. Still further, in other implementations, portions of an input mechanism may be selectively highlighted based on a particular operating mode to aid in providing input via the input mechanism.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects of the invention have been mainly described in the context of a mobile terminal. The invention, however, may be used with any type of device that includes a display.

In addition, aspects of the invention have been described in general with respect to changing a component from a transmissive state to a reflective state and vice versa. The terms transmissive and reflective are relative and one of ordinary skill in the art would understand that a transmissive state may correspond to a predominately transmissive state and a reflective state may correspond to a predominately reflective state. That is, various degrees of transmissiveness/reflectivity may be obtained.

Still further, aspects of the invention have been described with respect to using a film, such as a transition metal film, or a PNLCD, in which the state of the film/PNLCD changes its transmissive/reflective quality. It should be understood that other types of variable reflective devices may be used. For example, in other implementations, interferometric modulator (iMOD) technology, micro-electromechanical systems (MEMS) or other technology may be used to change the state of a display. In addition, in some implementations, a reflective device may be switched into and out of an optical path based on ambient light levels. For example, a reflector may be moved behind LCD 430 during high ambient light conditions and moved out of the optical path of light from light source 440 during low or normal lighting conditions.

Further, while series of acts have been described with respect to FIGS. 6 and 8, the order of the acts may be varied in other implementations consistent with the invention. Moreover, non-dependent acts may be performed in parallel.

It will also be apparent to one of ordinary skill in the art that aspects described herein may be implemented in methods and/or computer program products. Accordingly, aspects of the invention may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain aspects described herein may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile communication device, comprising:
   a display that includes:
      at least one light source,
      a light guide, and
      a plurality of variable reflecting components, where each of the plurality of variable reflecting components is disposed over a respective portion of the light guide, where each of the variable reflecting components is to operate in one of a partially transmissive mode or a partially reflective mode; and
   a processor to:
      adjust each of the plurality of variable reflecting components to operate in the partially transmissive mode or the partially reflective mode based on an amount of ambient light,
      where, when the mobile communication device executes a first application, a first subset of the plurality of variable reflecting components is in one of the partially transmissive mode or the partially reflective mode based on the amount of ambient light, and
      where, when the mobile communication device executes a second application, a second subset of the plurality of variable reflecting components, that differs from the first subset, is in one of the partially transmissive mode or the partially reflective mode based on the amount of ambient light.

2. The mobile communication device of claim 1, further comprising:
   a sensor to detect the amount of ambient light.

3. The mobile communication device of claim 1,
   where the plurality of variable reflecting components comprises at least one film, and
   the mobile communication device further comprises:
      a power supply to adjust power provided to the at least one.

4. The mobile communication device of claim 3, where the power supply is to terminate power provided to the at least one film when the amount of ambient light is less than a predetermined level.

5. The mobile communication device of claim 1, where the display further comprises:
   a liquid crystal display disposed over the plurality of variable reflecting components, where the liquid crystal display is:
      partially illuminated by light from the at least one light source directed via the light guide when the amount of ambient light is less than a predetermined level, and
      partially illuminated by ambient light when the amount of ambient light is greater than the predetermined level.

6. The mobile communication device of claim 1, where the plurality of variable reflecting components comprises at least one film, the at least one film comprising a transition metal.

7. The mobile communication device of claim 1, where the plurality of variable reflecting components comprises a polymer network liquid crystal display.

8. The mobile communication device of claim 7, further comprising:
a power supply to:
adjust power provided to the polymer network liquid crystal display based on the amount of ambient light and a setting on the mobile communication device.

9. The mobile communication device of claim 1, where at least one of the first subset or the second subset, of the plurality of variable reflecting components, switch to a substantially transmissive mode when the amount of ambient light is less than a certain level and switches to a substantially reflective mode when the amount of ambient light is greater than the certain level.

10. The mobile communication device of claim 1, where the processor, when adjusting each of the plurality of variable reflecting components to operate in one of the partially transmissive mode or the partially reflective mode, is further to:
adjust each of the plurality of variable reflecting components to operate in one of the partially transmissive mode or the partially reflective mode based on an input provided by a user of the mobile communication device.

11. The mobile communication device of claim 1, where the processor is further to regulate power to the at least one light source based on the amount of ambient light, where the processor, when regulating the power to the light source, is further to turn off the at least one light source when the amount of ambient light is above a threshold level.

12. The mobile communication device of claim 1, where the processor is further to automatically switch one or more of the plurality of variable reflecting components from one of the partially transmissive mode or the partially reflective mode to another of the partially transmissive mode or the partially reflective mode based on a change in the amount of ambient light.

13. In a device comprising a sensor and a display that includes a first variable reflector associated with a first area of the display and second variable reflector associated with a second area, of the display, that differs from the first area, a method comprising:
detecting an external light level with the sensor;
implementing a first application including:
automatically adjusting the first variable reflector to operate in one of a partially transmissive state or a partially reflective state based on the external light level detected by the sensor; and
ceasing implementing of the first application, including:
implementing a second application that differs from the first application,
automatically adjusting the second variable reflector to operate in the one of a partially transmissive state or the partially reflective state, and
automatically adjusting the first variable reflector to operate in another one of a partially transmissive state or the partially reflective state.

14. The method of claim 13, further comprising:
automatically adjusting one of the first variable reflector or the second variable reflector to operate at a substantially transmissive state when the external light level is less than a predetermined light level; and
automatically adjusting one of the first variable reflector or the second variable reflector to operate at a substantially reflective state when the external light level is greater than the predetermined light level.

15. The method of claim 13,
where the device further comprises a power supply, and
where the method further comprises:
adjusting power provided, from the power supply, to at least one of the first variable reflector or the second variable reflector based on the external light level detected by the sensor.

16. The method of claim 13, further comprising:
turning off a light source associated with the device when at least one of the first variable reflector or the second variable reflector is in the reflective state.

17. The mobile communication device of claim 1,
where the display further comprises a first plurality of input mechanisms associated with the first application and a second, different plurality of input mechanisms associated with the second application,
where the first subset of the plurality of variable reflecting components are dimensioned and positioned to correspond to the first plurality of input mechanisms, and
where the second subset of the plurality of variable reflecting components are dimensioned and positioned to correspond to second plurality of input mechanisms.

18. The method of claim 13,
where the display further comprises a first input mechanism associated with the first application and a second different input mechanism associated with the second application,
where the first variable reflector is dimensioned and positioned to correspond to the first input mechanism, and
where the second variable reflector is dimensioned and positioned to correspond to second input mechanism.

* * * * *